(12) United States Patent
Eom et al.

(10) Patent No.: US 9,495,536 B2
(45) Date of Patent: Nov. 15, 2016

(54) METHOD AND APPARATUS FOR DETERMINING INPUT

(75) Inventors: Ju-il Eom, Suwon-si (KR); Tae-young Kang, Seoul (KR); Yong-gook Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/590,875

(22) Filed: Aug. 21, 2012

(65) Prior Publication Data

US 2013/0091553 A1  Apr. 11, 2013

(30) Foreign Application Priority Data

Oct. 6, 2011 (KR) .................. 10-2011-0101836

(51) Int. Cl.
| | |
|---|---|
| *G06F 21/00* | (2013.01) |
| *G06F 21/44* | (2013.01) |
| *G06F 21/35* | (2013.01) |
| *H04L 29/06* | (2006.01) |

(52) U.S. Cl.
CPC ............ *G06F 21/445* (2013.01); *G06F 21/35* (2013.01); *H04L 63/08* (2013.01)

(58) Field of Classification Search
USPC ........... 726/2–3; 345/173–175, 179; 713/2–3
See application file for complete search history.

(56) References Cited

U.S. PATENT DOCUMENTS

| | | | |
|---|---|---|---|
| 6,133,906 A * | 10/2000 | Geaghan ................ | 345/179 |
| 7,353,393 B2 | 4/2008 | Hansen et al. | |
| 7,929,736 B2 * | 4/2011 | Bechtel ............... | G06F 3/03545 340/5.53 |
| 7,953,670 B2 * | 5/2011 | Colella .................. | G06Q 10/06 235/380 |
| 2002/0108039 A1 * | 8/2002 | Kubo .................... | G06F 3/0488 713/172 |
| 2003/0074562 A1 | 4/2003 | Hansen et al. | |
| 2004/0064698 A1 * | 4/2004 | Zhang .................... | G06F 21/34 713/169 |
| 2007/0165007 A1 * | 7/2007 | Morrison et al. ............. | 345/175 |
| 2008/0170042 A1 | 7/2008 | Yoon et al. | |
| 2009/0289914 A1 * | 11/2009 | Cho ........................ | G06F 3/044 345/173 |

(Continued)

FOREIGN PATENT DOCUMENTS

| | | |
|---|---|---|
| CN | 1557065 | 12/2004 |
| CN | 101770572 | 7/2010 |

(Continued)

OTHER PUBLICATIONS

"Automatic Stylus Identification System", IBM Technical Disclosure Bulletin, XP 000211156, vol. 34, No. 2, Jul. 1, 1991, 4 pages.

(Continued)

*Primary Examiner* — Harris C Wang
(74) *Attorney, Agent, or Firm* — The Farrell Law Firm, P.C.

(57) ABSTRACT

A method and apparatus for determining an input are provided. The method includes authenticating an external device, when the external device approaches in a predetermined range; determining an area approached by the external device and determining whether the determined area is valid; and outputting a predetermined indication to a predetermined area related to the area approached by the external device.

11 Claims, 5 Drawing Sheets

(56) References Cited

U.S. PATENT DOCUMENTS

| | | | | |
|---|---|---|---|---|
| 2010/0079414 | A1* | 4/2010 | Ferlitsch | G06F 3/03545 345/179 |
| 2012/0089719 | A1* | 4/2012 | Cha | H04W 12/08 709/223 |
| 2012/0331546 | A1* | 12/2012 | Falkenburg | G06F 3/03545 726/16 |
| 2014/0040983 | A1 | 2/2014 | Fang | |
| 2014/0368430 | A1* | 12/2014 | Choi | G06F 3/0488 345/156 |

FOREIGN PATENT DOCUMENTS

| | | |
|---|---|---|
| CN | 102156838 | 8/2011 |
| FR | 2826152 | 12/2002 |
| KR | 1020080067885 | 7/2008 |
| KR | 1020090000118 | 1/2009 |
| KR | 1020090005796 | 1/2009 |
| KR | 1020090121033 | 11/2009 |
| KR | 1020110085193 | 7/2011 |

OTHER PUBLICATIONS

European Search Report dated Jul. 8, 2015 issued in counterpart application No. 12838595.2-1853, 8 pages.
Chinese Office Action dated Apr. 25, 2016 issued in counterpart application No. 201280048886.6, 21 pages.

* cited by examiner

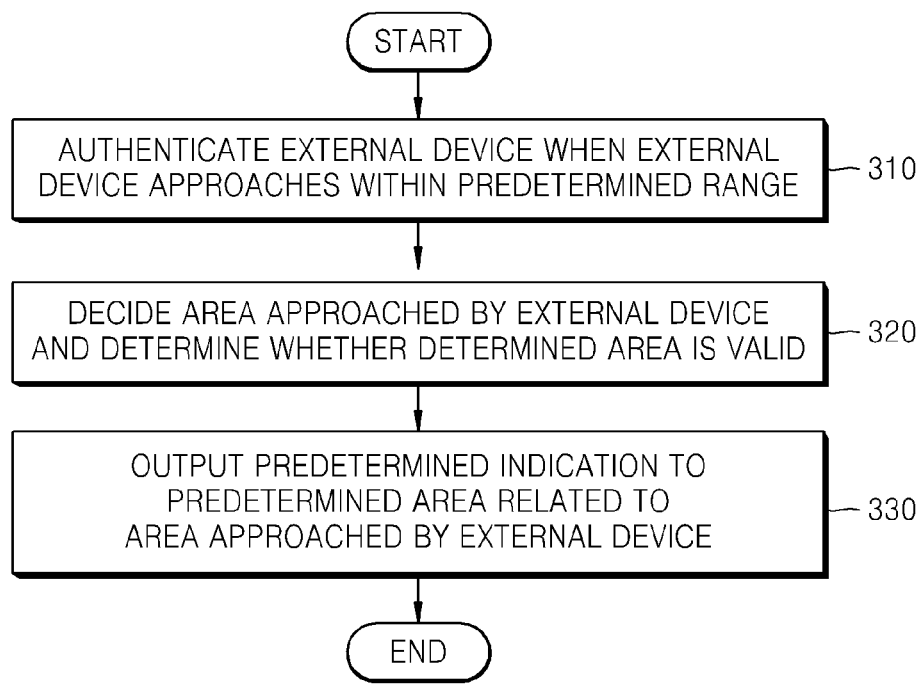
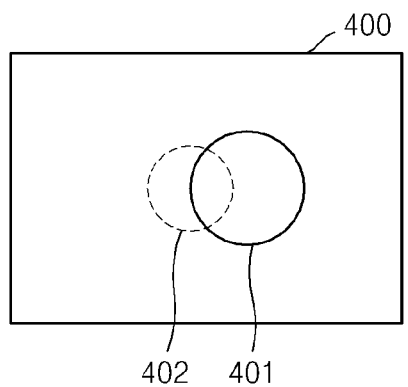

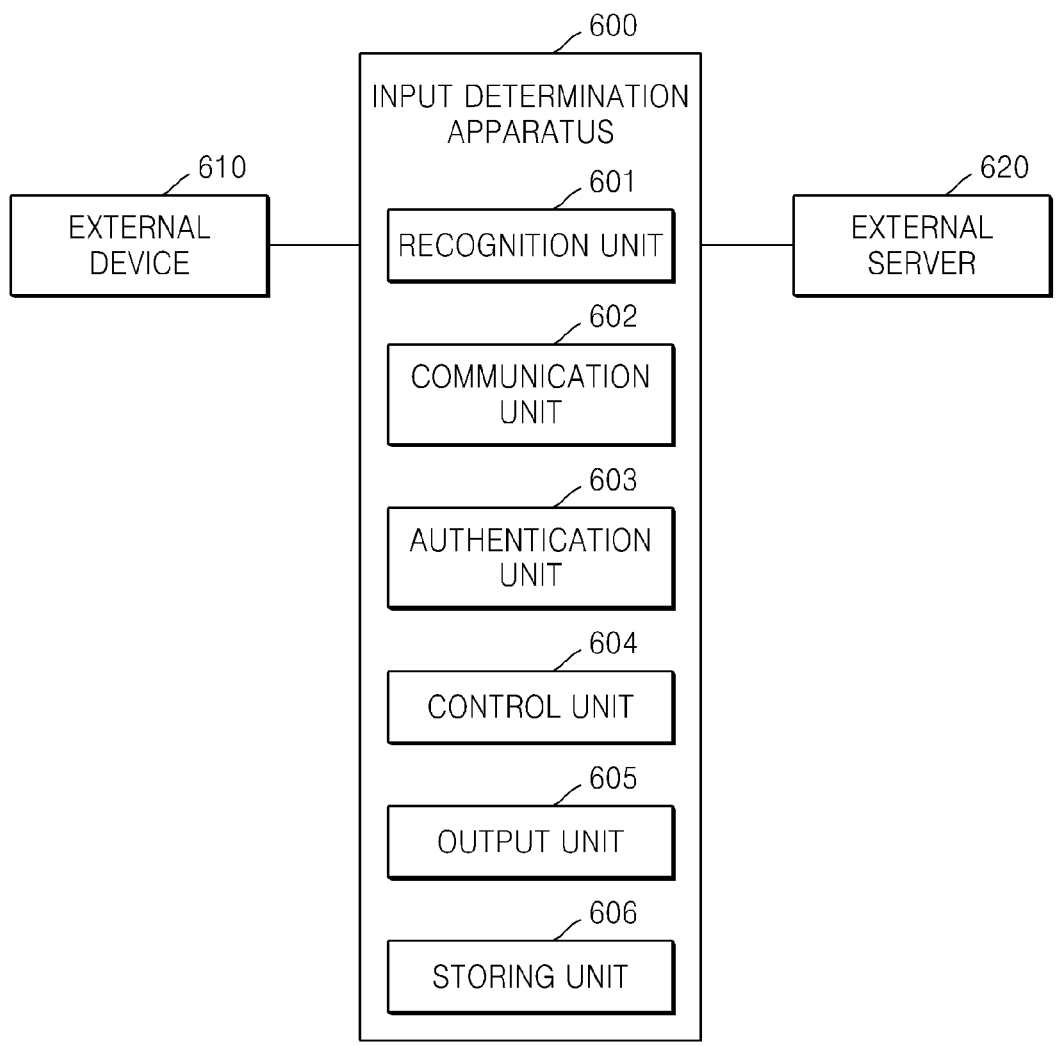

METHOD AND APPARATUS FOR DETERMINING INPUT

PRIORITY

This application claims priority under 35 U.S.C. §119(a) to of Korean Patent Application No. 10-2011-0101836, filed on Oct. 6, 2011 in the Korean Intellectual Property Office, the entire disclosure of which is incorporated herein by reference.

BACKGROUND OF THE INVENTION

1. Field of the Invention

The present invention relates generally to a method of determining an input and an apparatus using the same, and more particularly, to a method of determining an input that detects a position of an input by an input device and determines whether the input is a valid input, and an apparatus using the method.

2. Description of the Related Art

Currently, Near Field Communication (NFC) technology is used in a great number of mobile phones. NFC, which allows bi-directional communication between apparatuses in close proximity, is used in various services such as transportation cards, tickets, money transactions, and the like, and the range of use of NFC is being continuously expanded.

In the case of traditional signature or seal recognition, a signature or seal is input by a person and then confirmed.

It is necessary to apply the NFC technology to a field such as recognition of a signature or seal that is input by a person.

SUMMARY OF THE INVENTION

The present invention provides a method of determining an input, which detects a position of an input by an input device by using local wireless communication technology and determines whether the input is a valid input.

The present invention also provides an apparatus for determining an input, which detects a position of an input by an input device by using local wireless communication technology and determines whether the input is a valid input.

According to an aspect of the present invention, a method of determining an input, by an apparatus is provided. The method includes authenticating an external device, when the external device approaches in a predetermined range; determining an area approached by the external device and determining whether the determined area is valid; and outputting a predetermined indication to a predetermined area related to the area approached by the external device. According to another aspect of the present invention, an apparatus for determining an input is provided. The apparatus includes a recognition unit for recognizing an external device when the external device approaches within a predetermined range; an authentication unit for authenticating the external device when the external device is recognized by the recognition unit; a control unit for determining an area approached by the external device and then determining whether the determined area is valid; and an output unit for outputting a predetermined indication to a predetermined area related to the area approached by the external device.

BRIEF DESCRIPTION OF THE DRAWINGS

The above and other features and advantages of the present invention will become more apparent by describing in detail embodiments thereof with reference to the attached drawings in which:

FIG. 3 is a flowchart illustrating a method of determining an input, according to another embodiment of the present invention;

FIG. 4 is a diagram illustrating a method of determining validity in the input determination method of FIG. 3;

FIG. 6 is a block diagram of an input determination apparatus according to an embodiment of the present invention.

DETAILED DESCRIPTION OF EMBODIMENTS OF THE PRESENT INVENTION

Hereinafter, embodiments of the present invention will be described in detail with reference to the accompanying drawings.

Figure 1:
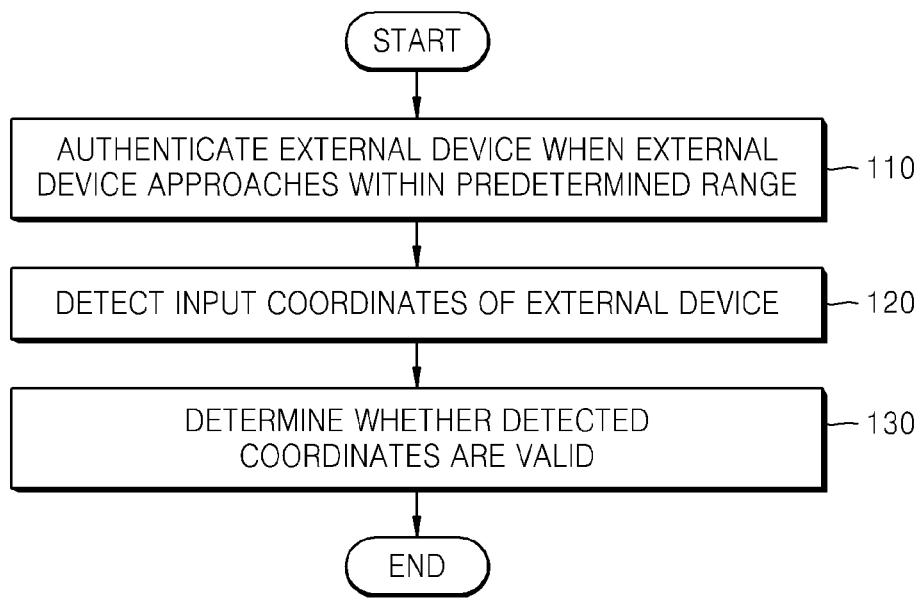
FIG. 1 is a flowchart illustrating a method of determining an input, according to an embodiment of the present invention.

FIG. 1 is a flowchart illustrating a method of determining an input, according to an embodiment of the present invention.

Referring to FIG. 1, in step 110, an apparatus for performing the method of determining an input (an input determination apparatus) authenticates an external device when the external device approaches within a predetermined range. The input determination apparatus recognizes the external device when the external device approaches within the predetermined range, and then authenticates the external device by using a predetermined method. The external device is an input device, and the external device includes a predetermined unit that is recognized by the input determination apparatus. The input determination apparatus also includes a unit that recognizes the external device. An example of this unit is an electronic tag and an electronic tag reader. For example, the external device includes the electronic tag, for example, a Radio-Frequency IDentification (RFID) tag, in which specific information, a personal IDentification (ID), or a business ID is included, and the input determination apparatus includes the electronic tag reader, for example, a RFID reader. The external device includes the electronic tag reader, and the input determination apparatus includes the electronic tag. Currently, Near Field Communication (NFC) technology as a type of electronic tag is commonly used in transmitting data between terminals at a short distance of about 10 centimeters with a non-contact local wireless communication module using the 13.56 Mhz frequency band. NFC is widely used in transmission of goods information or travel information for visitors in a supermarket or store as well as in gaining approval. NFC is also widely used in traffic control apparatuses, locking apparatuses for controlling entry, and the like. The external device includes an NFC chip, and the input determination apparatus includes an NFC reader.

If the external device is recognized, the input determination device receives an ID from the external device through a predetermined communication method, for example, NFC, and authenticates the external device based on the identifier received through a predefined authentication protocol.

In another embodiment of the present invention, a method of authenticating an external device is a method of authenticating the external device through an external server capable of communicating with the input determination apparatus. The input determination device receives an ID from the external device through a predetermined communication method, for example, NFC, and transmits the identifier ID of the external device to the external server. The external server receiving the identifier ID of the external device authenticates the external device based on an identifier received through a predefined authentication protocol, and transmits an authentication result, i.e., an authenticated identifier, to the input determination apparatus. The input determination apparatus receiving the authentication result then authenticates the external device if it determines that the authentication result indicates that the external device has been authenticated.

In another embodiment of the present invention, a method of authenticating an external device authenticates the external device. The input determination apparatus transmits its identifier to the external device through a predetermined communication method, for example, NFC. The external device receiving the identifier from the input determination apparatus authenticates the input determination apparatus based on an identifier of the input determination apparatus received through a predefined authentication protocol, and then transmits an authentication result, i.e., an authenticated identifier, to the input determination apparatus. The input determination apparatus receiving the authentication result then authenticates the external device based on the received authentication result.

In step 120, the input determination apparatus detects input coordinates from the external device. The input determination apparatus detects coordinates of a position, which are input at first by the external device, and detects a movement of the input coordinates by tracing continuous input coordinates. For example, if a signature is input by the external device, which is an input device, to the input determination apparatus, the input determination apparatus detects coordinates input at first, and detects a movement of the coordinates by tracing the coordinates. The input determination apparatus includes a screen through which an input such as a touch is performed or a pad through which an input such as a touch is performed without a screen. The external device is an input device that performs an input at specific coordinates on the screen or the pad. For example, the external device includes a pen form, a stylus form, or a seal form. The feature discussed above has been described assuming a touch, that is, a contact, between the input determination apparatus and the external device that is the input device. However, in a case in which the input determination apparatus recognizes the external device and detect an input, the present invention is not limited to the contact. That is, when the external device inputs data in proximity to the input determination apparatus although not contacting the input determination apparatus, the input determination apparatus detects input coordinates regardless of the lack of contact.

In step 130, the input determination apparatus determines whether the detected coordinates are valid. The detected coordinates are considered valid if the detected coordinates coincide with the pre-stored input coordinates, as compared by the input determination apparatus. For example, the input determination apparatus detects coordinates based on a signature step performed by the external device which is the input device, compares the detected coordinates with a pre-stored signature (i.e., pre-stored input coordinates), and then determines that the detected coordinates are valid if the detected coordinates are the same as the pre-stored signature. In another embodiment, the input coordinates which are compared with the detected coordinates is not previously be stored but are received from another external device.

Figure 2:
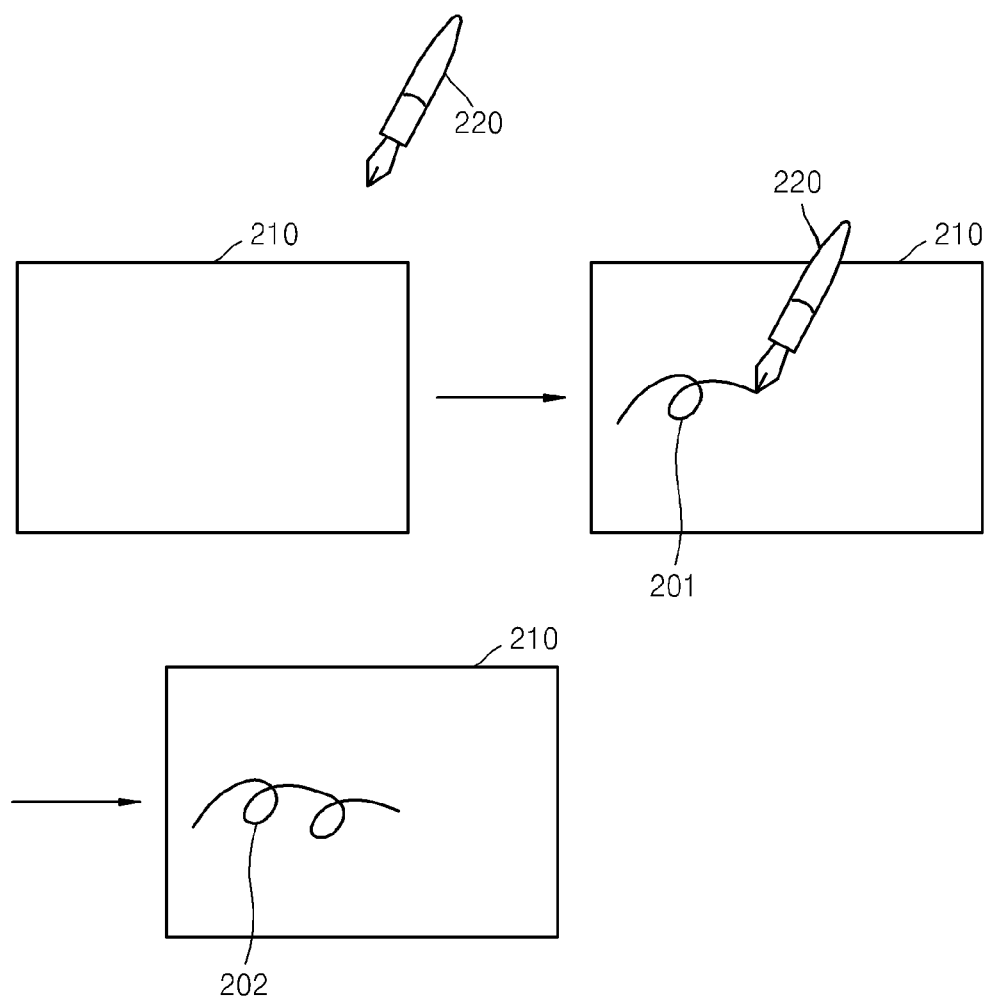
FIG. 2 is a diagram illustrating the input determination method of FIG. 1.

FIG. 2 is a diagram illustrating the input determination method of FIG. 1.

Referring to FIG. 2, if an external device 220, which is an input device, approaches an input determination apparatus 210, the input determination apparatus 210 recognizes the external device 220 and authenticates the external device 220. The input determination apparatus 210 then detects a trace of coordinates of an input 201 by the external device 220. The input determination apparatus 210 determines validity of a final input 202 by comparing a trace of coordinates of the final input 202 with pre-stored coordinates.

FIG. 3 is a flowchart illustrating a method of determining an input, according to another embodiment of the present invention.

Referring to FIG. 3, in step 310, an apparatus for performing the method of determining an input (an input determination apparatus) authenticates an external device if the external device approaches within a predetermined range. That is, if the external device approaches within the predetermined range, the input determination apparatus recognizes the external device and then authenticates the external device by using a predetermined method. The external device is an input device, and the external device includes a predetermined unit that is recognized by the input determination apparatus. The input determination apparatus also includes a predetermined unit that recognizes the external device. An example of the predetermined unit is an electronic tag and an electronic tag reader. For example, the external device includes the electronic tag, for example, RFID, in which specific information, a personal ID, or a business ID is included, and the input determination apparatus includes the electronic tag reader, for example, a RFID reader. The external device includes the electronic tag reader, and the input determination apparatus includes the electronic tag. Currently, NFC technology is a kind of electronic tag that is commonly used in transmitting data between terminals at a short distance of about 10 centimeters with a non-contact local wireless communication module using a 13.56 Mhz frequency band. The NFC is widely used in transmission of goods information or travel information for visitors in a supermarket or store as well as in gaining approval. NFC is also used in traffic control apparatuses, locking apparatuses for controlling entry, and the like. The external device includes an NFC chip, and the input determination apparatus includes an NFC reader.

In the another embodiment of the present invention, if the external device is recognized, the input determination device receives an IDentifier (ID) from the external device through a predetermined communication method, for example, NFC, and authenticates the external device based on an identifier received through a predefined authentication protocol.

In another embodiment of the present invention, a method of authenticating an external device involves authenticating the external device through an external server capable of communicating with the input determination apparatus. The input determination device receives an ID from the external device through a predetermined communication method, for example, NFC, and transmits the ID of the external device to the external server. The external server receiving the ID of the external device authenticates the external device based on an identifier received through a predefined authentication protocol, and transmits an authentication result, i.e., an authenticated identifier to the input determination apparatus. The input determination apparatus receiving the authentication result authenticates the external device if it determines that the authentication result indicates that the external device has been authenticated.

In another embodiment of the present invention, a method of authenticating an external device is a method of authenticating the external device through itself. The input determination apparatus transmits its own identifier to the external device through a predetermined communication method, for example, NFC. The external device receiving the identifier from the input determination apparatus authenticates the input determination apparatus based on an identifier of the input determination apparatus received through a predefined authentication protocol, and transmits an authentication result, i.e., an authenticated identifier to the input determination apparatus. The input determination apparatus receiving the authentication result then authenticates the external device if it determines that the authentication result indicates that the input determination apparatus itself has been authenticated.

In step 320, the input determination apparatus determines an area approached by the external device and determines whether the determined area is valid. In the embodiment of the present invention, the external device contacts the input determination apparatus. However, if the input determination apparatus recognizes the external device and detect coordinates for the approached area, the present invention is not limited to a case where contact occurs. That is, when the external device inputs data close to the input determination apparatus while not contacting the input determination apparatus, the input determination apparatus detects input coordinates regardless of whether there is contact. The input determination apparatus includes a screen through which an input such as a touch is performed or includes a pad through which an input such as a touch is performed but which does not have a screen. The external device is an input device that performs an input at specific coordinates on the screen or the pad. For example, the external device includes a pen, a stylus, or a stamp.

Below, a case in which the external device contacts the input determination apparatus and then inputs data is explained. As stated above, this is just an example and the present invention is not limited to a case where contact occurs.

If the external device contacts the input determination apparatus, the input determination apparatus detects coordinates of a contact area and determines the contact area. If the contact area of the external device exists in a predetermined valid area, the input determination apparatus determines that there is a valid input. Moreover, although the contact area of the external device is in the predetermined valid area, the input determination apparatus determines that there is a valid input only when the contact area is larger than a predetermined size. That is, criteria used by the input determination apparatus to determine validity of an input of the external device are determined based on the predetermined valid area (a position) and the contact area.

FIG. 4 is a diagram illustrating a method of determining validity in the input determination method of FIG. 3.

Referring to FIG. 4, a predetermined valid area 401 and a contact area 402 are illustrated in an input determination apparatus 400. In FIG. 4, the contact area 402 is not completely included in the predetermined valid area 401 but is partially included in the predetermined valid area 401, and, the input determination apparatus 400 determines whether the contact area 402 is in the valid area 401 depending on a predetermined criterion and determine validity of an input. Moreover, the input determination apparatus 400 considers a size of the contact area 402 to determine the validity of the input.

In step 330, the input determination apparatus outputs a predetermined indication to a predetermined area related to the contact area if the validity of the input is determined. The predetermined area related to the contact area is a predetermined valid area, which is a criterion for determining the validity of the contact area.

Figure 5:
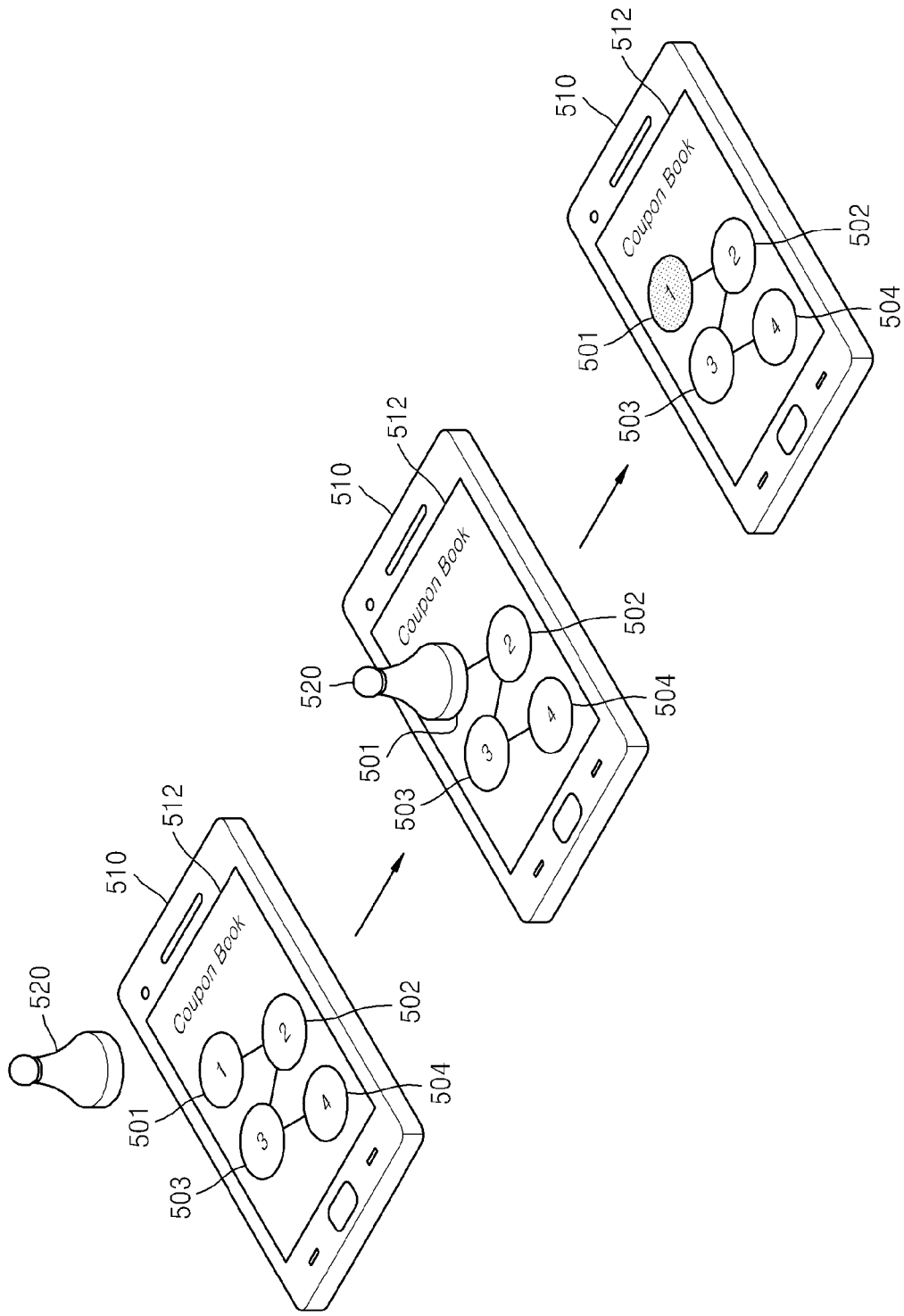
FIG. 5 is a diagram illustrating the input determination method of FIG. 3.

FIG. 5 is a diagram illustrating the input determination method of FIG. 3.

Referring to FIG. 5, an electronic seal 520 which is an input device, a terminal 510 which is an input determination apparatus, an interface 512 for a input determination method which is performed in the terminal 510, and valid areas 501 through 504 included in the interface 512 are illustrated. When the electronic seal 520 contacts the terminal 510, the terminal 510 authenticates the electronic seal 520. If authentication is completed, the terminal 510 determines whether a contact area of the electronic seal 520 exists in a valid area 501 of the interface 512. If it is determined that the contact area of the electronic seal 520 exists in the valid area 501, the terminal 510 then provides a predetermined output (the shadow part of the valid area 501).

FIG. 6 illustrates an input determination apparatus 600 according to an embodiment of the present invention.

Referring to FIG. 6, the input determination apparatus 600 includes a recognition unit 601, a communication unit 602, an authentication unit 603, a control unit 604, an output unit 605, and a storing unit 606. The input determination apparatus 600 includes a screen through which an input such as a touch is performed or includes a pad through which an input such as a touch is performed but which does not have a screen. The external device 610 is an input device that performs an input at specific coordinates on the screen or the pad. For example, the external device 610 includes a pen, a stylus, or a seal. Although the embodiment of the present invention has been described assuming a touch, i.e., a contact between the input determination apparatus 600 and the external device 610 which is the input device, in a case in which the input determination apparatus 600 recognizes the external device 610 and detect an input, the present invention does not require contact. That is, when the external device 610 inputs data in proximity to the input determination apparatus 600 while not contacting the input determination apparatus 600, the input determination apparatus 600 detects input coordinates irrespective of whether there is contact.

The recognition unit 601 recognizes the external device 610 if the external device 610 approaches within a predetermined range. For example, if the external device 610 includes an electronic tag, for example, RFID, in which specific information, a personal ID, or a business ID is included, the recognition unit 601 includes an electronic tag reader. The external device 610 includes the electronic tag reader, and the recognition unit 601 includes the electronic tag. Currently, NFC technology as a kind of electronic tag is commonly used in transmitting data between terminals at a short distance of about 10 centimeters with a non-contact local wireless communication module using a 13.56 Mhz frequency band. NFC is widely used in transmission of goods information or travel information for visitors in a supermarket or store as well as in gaining approval. NFC is also widely used in traffic control apparatuses, locking apparatuses for controlling entry, and the like. The external device 610 includes an NFC chip, and the recognition unit 601 includes an NFC reader.

After the external device 610 is recognized by the recognition unit 601, the authentication unit 603 authenticates the external device 610 by using a predetermined method. In an embodiment of the present invention, if the external device 610 is recognized, the authentication unit 603 receives an ID from the external device 610 through the communication unit 602, and authenticates the external device 610 based on an identifier received through a predefined authentication protocol.

In another embodiment of the present invention, a method of authenticating the external device 610 involves authenticating the external device 610 through an external server 620 capable of communicating with the input determination apparatus 600. The authentication unit 603 receives an ID from the external device 610 through the communication unit 602, and transmits the ID of the external device 610 to the external server 620. The external server 620 receiving the ID of the external device 610 authenticates the external device 610 based on an identifier received through a predefined authentication protocol, and then transmits an authentication result, that is, an authenticated identifier to the input determination apparatus 600. The authentication unit 603 of the input determination apparatus 600, which receives the authentication result, then authenticates the external device 610 if it determines that the authentication result indicates that the external device has been authenticated.

In another embodiment of the present invention, a method of authenticating the external device 610 is a method of authenticating the external device 610 through itself. The authentication unit 603 transmits its own identifier to the external device 610 through the communication unit 602. The external device 610 receiving the identifier from the authentication unit 603 authenticates the input determination apparatus 600 based on an identifier of the input determination apparatus 600 received through a predefined authentication protocol, and then transmits an authentication result, that is, an authenticated identifier to the input determination apparatus 600. The authentication unit 603 of the input determination apparatus 600, which receives the authentication result, then authenticates the external device 610 based on the received authentication result.

An embodiment of a method of determining the validity of an input of the external device 610 is explained below.

The control unit 604 detects input coordinates of the external device 610 when an input is received from the external device 610. The control unit 604 detects coordinates of a position, which are input at first by the external device 610, and detects a movement of the input coordinates by tracing continuous input coordinates. For example, when the external device 610, which is an input device, accesses the input determination apparatus 600, the control unit 604 detects the coordinates input at first, and detects a movement of the coordinates by tracing the coordinates. The control unit 604 then determines whether the detected coordinates are valid. The control unit 604 compares the detected coordinates with pre-stored input coordinates, and determines that the detected coordinates are valid coordinates if the detected coordinates are the same as the pre-stored input coordinates. For example, the control unit 604 detects coordinates depending on a signature step by the external device which is the input device, compares the detected coordinates with a pre-stored signature (i.e., pre-stored input coordinates), and determines that the detected coordinates are valid if the coordinates coincide with the pre-stored signature. In another embodiment, the input coordinates, which are compared with the detected coordinates, are not previously stored in the storing unit 606 but received from another external server 620.

Another embodiment of a method of determining the validity of an input of the external device 610 is explained below.

The control unit 604 determines an area approached by the external device 610 and determines whether the determined area is valid. In the current embodiment of the present invention, the external device 610 contacts the input determination apparatus 600. Below, an example in which the external device 610 contacts the input determination apparatus 600 and then inputs data is explained. However, as stated above, this is an example and the present invention is not limited to a case where contact occurs.

If the external device 610 contacts the input determination apparatus 600, the control unit 604 detects coordinates of a contact area and then determines the contact area. If the contact area of the external device 610 exits in a predetermined valid area, the control unit 604 determines that there is a valid input. Moreover, even if the contact area of the external device 610 exists in the predetermined valid area, the control unit 604 determines that there is a valid input only when the contact area is larger than a predetermined size. That is, the criteria used by the control unit 604 to determine the validity of an input of the external device 610 is the predetermined valid area (a position) and the contact area.

The output unit 605 outputs a predetermined indication to a predetermined area related to the contact area if the validity of the input is determined. The predetermined area related to the contact area is a predetermined valid area that is a criterion for determining the validity of the contact area.

The input determination method described above may be embodied as a computer-readable code on a computer-readable recording medium. The computer-readable recording medium may be any kind of recording device capable of storing data that is readable by a computer. Examples of the computer-readable recording medium include Read-Only Memory (ROM), Random Access Memory (RAM), CD-ROMs, magnetic tapes, floppy disks, and optical data storage devices. The computer-readable recording medium may also be distributed over a network of coupled computer systems so that the computer-readable code is stored and executed in a decentralized fashion. Function programs, code, and code segments for implementing the input determination method may be easily derived by programmers of ordinary skill in the art.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method of determining an input by an apparatus, the method comprising:
   displaying a plurality of predetermined areas and a plurality of indicators on a screen of the apparatus, wherein the indicators are displayed respectively within the plurality of predetermined areas and indicate a sequence of the plurality of predetermined areas;
   authenticating, by an authenticator, an electronic seal, when the electronic seal contacts or is within a predetermined range of the screen of the apparatus;

determining an area stamped on the screen of the apparatus by the electronic seal and determining that the stamped area is valid when the stamped area is included in any one of the plurality of predetermined areas and is larger than a predetermined size; and displaying a predetermined indication on the predetermined area including the stamped area when the stamped area is valid, wherein the displayed predetermined indication covers all of the predetermined area.

2. The method of claim 1, wherein determining the area comprises detecting coordinates of the area stamped on the screen of the apparatus by the electronic seal.

3. The method of claim 1, wherein authenticating the electronic seal comprises:

receiving an identifier of the electronic seal when the electronic seal is stamped on the screen of the apparatus; and authenticating the electronic seal based on the received identifier.

4. The method of claim 3, wherein authenticating the electronic seal based on the received identifier comprises:

transmitting the identifier to an external server;

receiving an authenticated identifier from the external server; and authenticating the electronic seal based on the authenticated identifier.

5. The method of claim 1, wherein authenticating the electronic seal comprises:

transmitting an identifier to the electronic seal when the electronic seal is stamped on the screen of the apparatus;

receiving an authenticated identifier from the electronic seal; and authenticating the electronic seal based on the authenticated identifier.

6. An apparatus for determining an input, the apparatus comprising:

a display for displaying a plurality of predetermined areas and a plurality of indicators, wherein the indicators are displayed respectively within the plurality of predetermined areas and indicate a sequence of the plurality of predetermined areas;

a recognizer for recognizing an electronic seal when the electronic seal contacts or is within a predetermined range of the display;

an authenticator for authenticating the electronic seal when the electronic seal is recognized by the recognizer; and a controller for determining an area stamped on the display by the electronic seal and then determining that the stamped area is valid when the stamped area is included in any one of the plurality of predetermined areas and is larger than a predetermined size, wherein the display is configured to display a predetermined indication on the predetermined area including the stamped area when the stamped area is valid, and wherein the displayed predetermined indication covers all of the predetermined area.

7. The apparatus of claim 6, wherein the controller determines the area by detecting coordinates of the area stamped on the display by the electronic seal.

8. The apparatus of claim 6, further comprising:

a communicator for receiving an identifier of the electronic seal from the electronic seal recognized by the recognizer, wherein the authenticator authenticates the electronic seal based on the received identifier.

9. The apparatus of claim 8, wherein the communicator transmits the identifier to an external server and receives an authenticated identifier from the external server, and the authenticator authenticates the electronic seal based on the authenticated identifier.

10. The apparatus of claim 6, further comprising:

a communicator for transmitting an identifier of the electronic seal to the electronic seal recognized by the recognizer and receiving an authenticated identifier from the electronic seal, wherein the authenticator authenticates the electronic seal based on the authenticated identifier.

11. A non-transitory computer-readable recording medium having recorded thereon a program for embodying a method of determining an input, the method comprising:

displaying a plurality of predetermined areas and a plurality of indicators on a screen of an apparatus, wherein the indicators are displayed respectively within the plurality of predetermined areas and indicate a sequence of the plurality of predetermined areas;

authenticating an electronic seal when the electronic seal contacts or is within a predetermined range of the screen of the apparatus;

determining an area stamped on the screen of the apparatus by the electronic seal and determining that the stamped area is valid when the stamped area is included in any one of the plurality of predetermined areas and is larger than a predetermined size; and displaying a predetermined indication on the predetermined area including the stamped area when the stamped area is valid, wherein the displayed predetermined indication covers all of the predetermined area.

* * * * *